United States Patent [19]
Duffy

[11] 3,747,471
[45] July 24, 1973

[54] POWER STEERING GEAR MECHANISM
[75] Inventor: James J. Duffy, Livonia, Mich.
[73] Assignee: Ford Motor Company, Dearborn, Mich.
[22] Filed: Sept. 7, 1971
[21] Appl. No.: 178,094

[52] U.S. Cl. .................................. 91/382, 91/466
[51] Int. Cl. ............................................ F15b 9/10
[58] Field of Search ...................... 91/382, 368, 466

[56] References Cited
UNITED STATES PATENTS

| | | | |
|---|---|---|---|
| 2,531,428 | 11/1950 | Hautzenroeder | 91/382 |
| 2,682,778 | 7/1954 | Creson et al. | 91/382 |
| 2,782,652 | 2/1957 | Fletcher | 91/382 |
| 3,218,937 | 11/1965 | Dettlof | 91/382 |
| 3,292,499 | 12/1966 | Duffy | 91/382 |

Primary Examiner—Paul E. Maslousky
Attorney—Keith L. Zerschling, Donald J. Harrington et al.

[57] ABSTRACT

A power steering gear mechanism for use with a wheeled vehicle comprising a torsion rod assembly for transferring steering effort to a driven member of the steering mechanism, a fluid motor for providing a power assist in actuating the driven member and a control valve mechanism for controlling distribution of pressure to the motor including a force transmitting linkage connected to the driven member and adapted for angular adjustment in proportion to the force transmitted therethrough, said linkage being connected to a movable valve element of said valve mechanism for effecting displacement of the latter in proportion to the degree of torque transmitted to the driven member.

15 Claims, 11 Drawing Figures

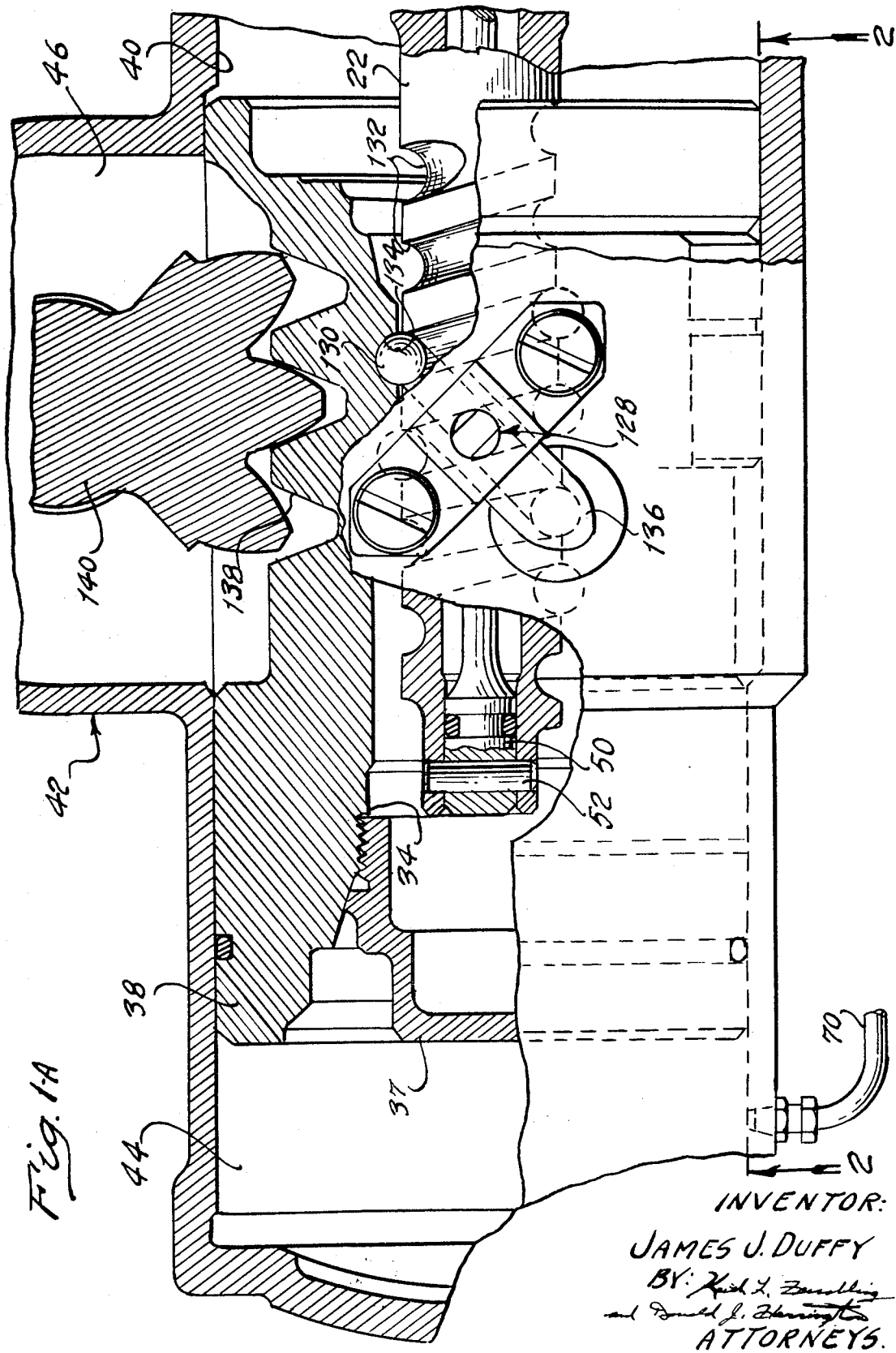

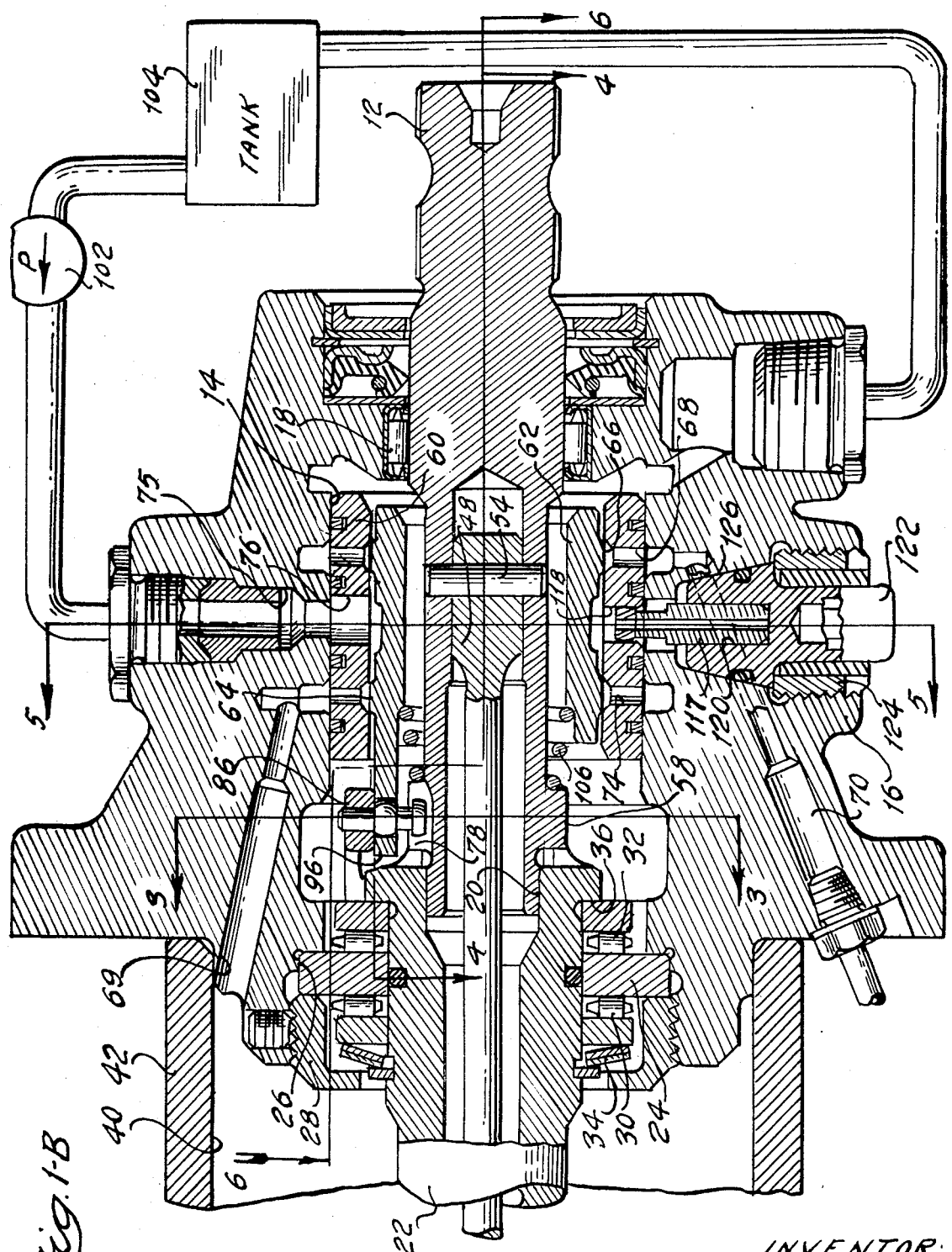

INVENTOR:
JAMES J. DUFFY
ATTORNEYS.

INVENTOR:
JAMES J. DUFFY
BY:
ATTORNEYS.

POWER STEERING GEAR MECHANISM

GENERAL DESCRIPTION OF THE INVENTION

The improvements of my invention relate generally to power steering mechanisms for controlling the dirigible wheels of a wheeled vehicle. It includes elements that are common to power steering mechanisms such as the one described in my U.S. Pat. No. 3,292,499, which is assigned to the assignee of this invention. Such mechanisms may include a servo motor for obtaining a power steering boost to supplement the manual steering effort applied by the vehicle operator to the steering shaft. The servo motor includes a worm shaft, a gear rack and a cooperating sector gear, the latter being connected to the vehicle steering linkage mechanism. The worm shaft is connected by means of a recirculating ball nut assembly to a piston for the servo motor. The piston, which carries a gear rack in mesh with the sector gear, cooperates with a cylinder to define opposed working chambers. The pressure source for the servo motor is a positive displacement pump driven by the vehicle engine.

The driven worm shaft is connected to the driver operated steering shaft through a torsion rod. A cylindrical spool valve surrounding the torsion rod and steering shaft is situated in conduit structure that connects the servo motor working chambers with the positive displacement pump. A mechanical connection between the steering shaft and the cylindrical spool valve causes displacement of the spool valve in one direction or the other depending upon the direction of the torque applied to the steering shaft.

In my earlier U.S. Pat., No. 3,292,499, torque is transmitted from the steering shaft to the worm shaft through a cam and ball arrangement. Cam slots are formed on the steering shaft and on a surrounding portion of the worm shaft, and cam balls register with the slots. A valve spool for controlling distribution of pressure to the servo motor is joined to the cam balls and is actuated by the cam balls as the latter move axially upon application of torque to the steering shaft.

The valve arrangement of my instant invention, as well as the invention of U.S. Pat. No. 3,292,499, provides for continuous fluid circulation from the positive displacement pump to the servo motor and hence to the exhaust region in a so-called open circuit. As the valve is displaced in one direction or the other, a back pressure develops on the upstream side of the valve. If valve displacement is in one direction, fluid pressure is caused to develop in one of the working chambers as the opposite working chamber is connected to the exhaust region. The pressure distribution in the working chambers is reversed upon shifting movement of the valve in the opposite direction.

The improvement of this invention resides principally in the means for effecting torque transmission from the steering shaft to the worm shaft and from the steering shaft to the pressure distribution valve. The connection is in the form of a linkage having an adjustable link connected to the worm shaft and a sliding cam and follower connection between the opposite end of the link and the steering shaft. Torque is transmitted through the link between the steering shaft and the worm shaft. The angle that the link forms with respect to the axes of the two shafts depends upon the torque being distributed through the link. The link is connected to the valve so that valve displacement will occur in proportion to the torque being distributed. Valve displacement is utilized to control distribution of pressure to one side or the other of the servo motor so that a hydrostatic power assist is developed as torque is applied to the steering shaft.

This improved linkage mechanism for actuating the steering valve and for distributing mechanical torque from the steering shaft to the worm shaft reduces friction inherent in the usual cam and slot connections in arrangements of this type and provides a reliable means for actuating the valve. Close tolerance fits in the valve may be used. Rotary movement of the steering shaft results in axial movement of the control valve in either one direction or the other depending upon the direction of the torque applied to the steering shaft.

BRIEF DESCRIPTION OF THE FIGURES OF THE DRAWING

FIGS. 1A and 1B show a longitudinal cross sectional view of an improved power steering gear mechanism embodying the improvements of my invention as seen from the plane of section line 1B—1B of FIG. 5 and section line 1A—1A of FIG. 2.

PARTICULAR DESCRIPTION OF THE INVENTION

Figure 2:
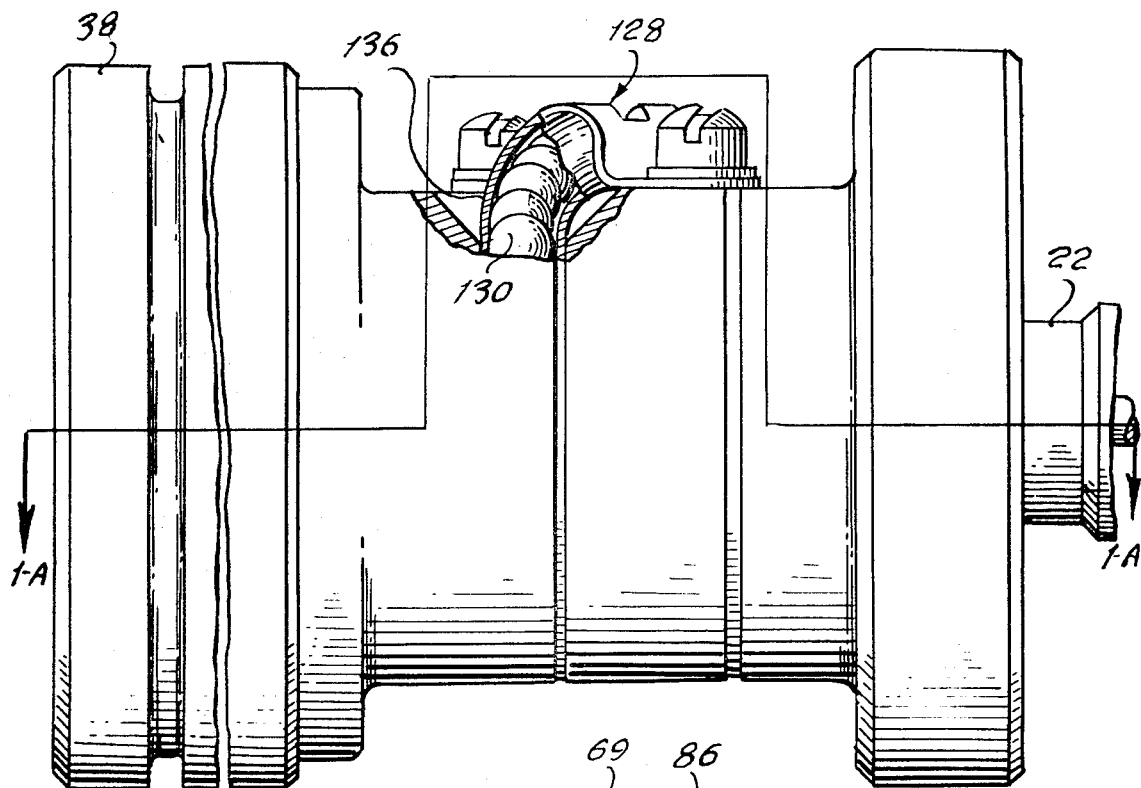
FIG. 2 is a side elevational view partly in section showing the piston for the servo motor of FIGS. 1A and 1B as seen from the plane of section line 2—2 of FIG. 1A.

In FIG. 1B, reference character 12 designates a driver operated steering shaft. It is positioned concentrically within a valve cylinder 14 formed in housing 16. Shaft 12 is journaled by a bearing 18 situated in a bearing opening formed in the housing 16 at one end of the cylinder 14. The outboard end of the shaft 12 is splined to permit a driving connection with a driver operated shaft. The inboard end of the shaft 12 is piloted within a pilot opening 20 formed in worm shaft 22. One end of shaft 22 is supported by a thrust ring 24 received in bearing opening 26. A lock-nut 28 secures the bushing in place. Radial needle thrust bearings 30 and 32 are situated on the other side of the bushing 24. The thrust bearings are loaded by Belleville spring 34, which is anchored against a snap ring carried by the shaft 22. Shoulder 36 engages a reaction ring situated adjacent thrust washer 32. Threaded closure member 37 is received within threaded opening 34 to seal the interior of piston 38. This is slidably received within cylinder 40 defined by steering gear housing 42.

Piston 38 cooperates with the housing to define a working chamber on each side thereof, one chamber being identified by reference character 44 and the other being identified by reference character 46.

The inner end of the steering shaft 12 is centrally apertured to receive one end of a torsion rod 48. Shaft 22, which is hollow, also receives torsion rod 48. The end 50 of the rod 48 is pinned by means of a cross pin 52 to the end of the worm shaft 22. The opposite end of the shaft 48 is pinned by cross pin 54 to the shaft 12.

Figure 3:
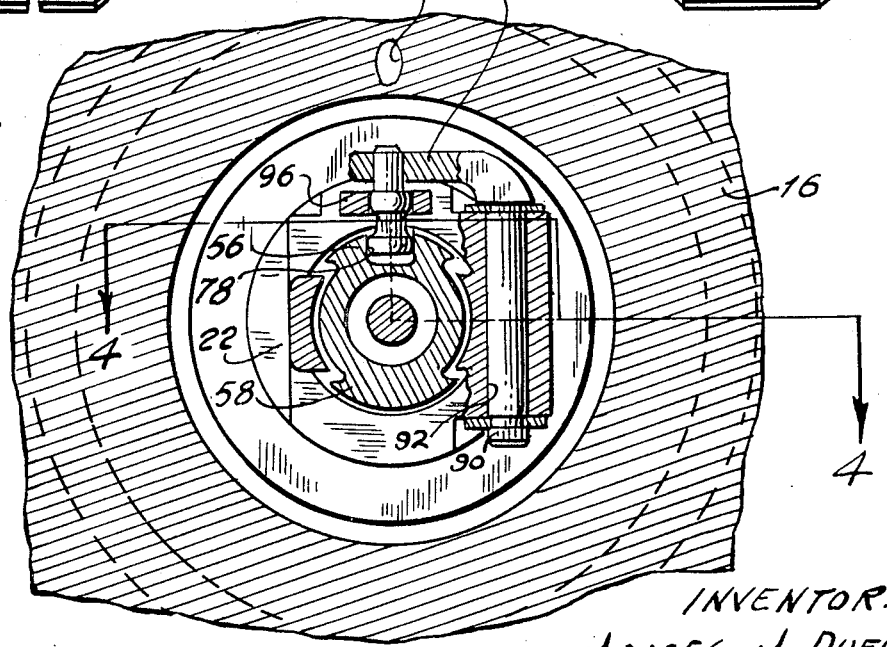
FIG. 3 is a cross sectional view of the valve structure of FIG. 1B as seen from the plane of section line 3—3 of FIGS. 1B and 4.

The pilot opening 20, as seen in FIG. 3, is formed with diametrically opposite openings through which reaction shoulders on the shaft 12 extend as indicated at 56 and 58. Upon rotary adjustment of shaft 12 with respect to the shaft 22 beyond predetermined limits, the reaction shoulders 56 and 58 engage the cooperating shoulders on the worm shaft 22.

Valve sleeve 60 is positioned in the cylinder 14. A cylindrical valve spool 62 is slidably positioned in the sleeve 60. It is formed with external valve lands 64 and 66 which register with internal valve lands formed in the sleeve 60. A passage 66 formed in the housing 16 extends from working chamber 44 to valve port 68 in the sleeve 60. A companion passage 70 formed in the housing 16 communicates with the other working chamber 46 and extends to a second port 72 formed in the sleeve 60. A pressure supply passage 75 communicates with a central port 76 formed in the sleeve 60. Lands 64 and 66 control the degree of communication between port 76 and each of the ports 74 and 68.

Shaft 12 is formed with an axial groove 78 which registers with one end 80 of a pin 82. The end 80 is crowned to provide a segment of a sphere so that the centerline of the pin may be allowed to move to an offset position with respect to the centerline of the valve 62.

Figure 4:
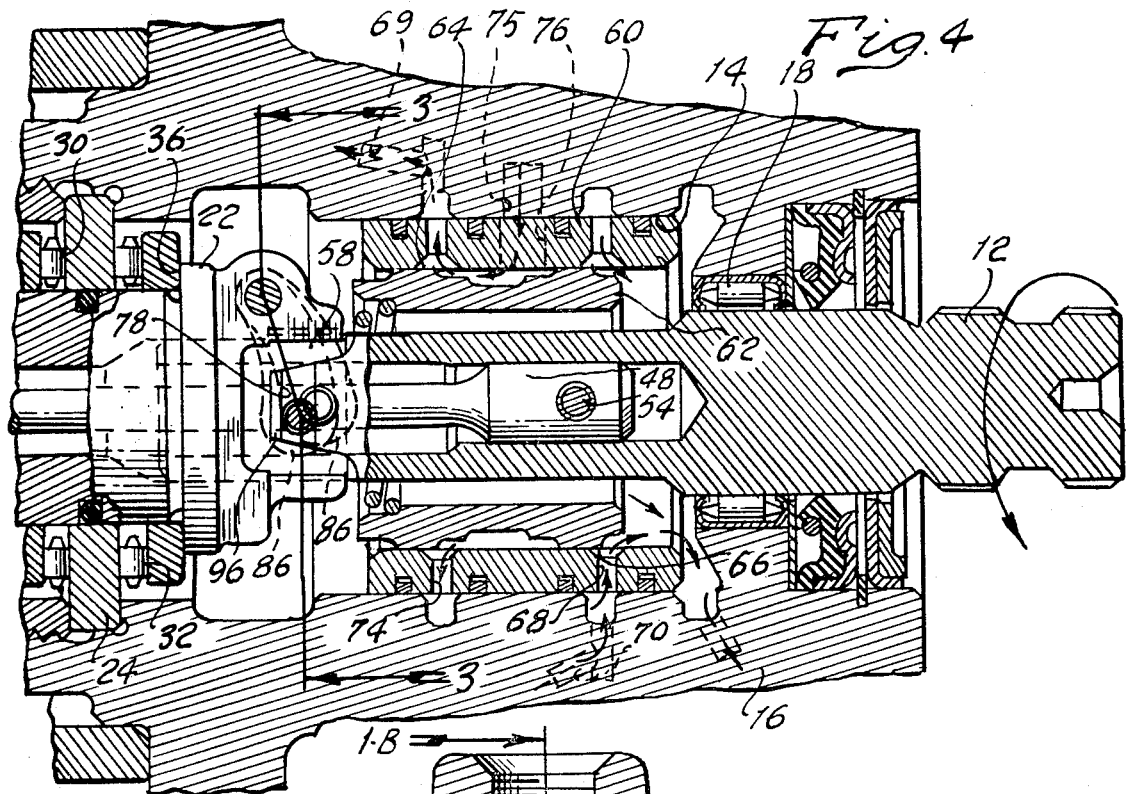
FIG. 4 is a cross sectional view taken along the plane of section line 4—4 of FIG. 3.
Figure 5:
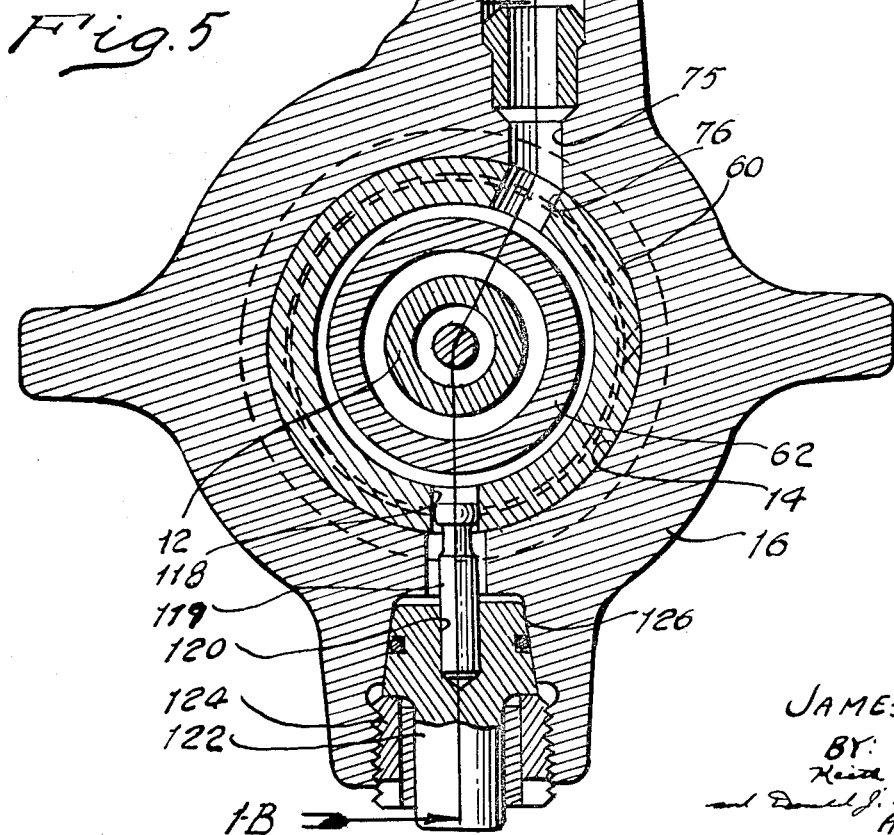
FIG. 5 is a cross sectional view taken along the plane of section line 5—5 of FIG. 1B.
Figure 7:
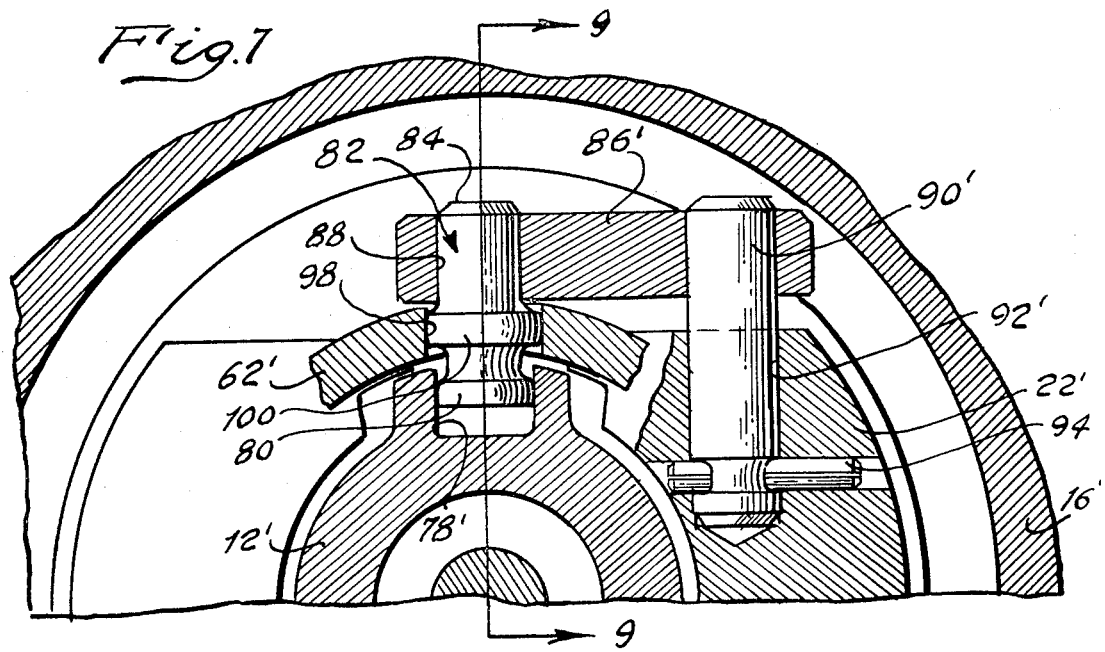
FIG. 7 is an enlarged view of a linkage arrangement for actuating the valve assembly of my invention. It is taken along section line 7—7 of FIG. 9.

The other end 84 of the pin 82 is carried by one end of a force transmitting link 86. The end of link 86 is provided with a cylindrical opening 88 which receives the end 84 and holds the pin 82 fast with respect to the link 86. The other end of the link 86 is carried by a support pin 90 which is rotatably mounted in cylindrical opening 92 formed in one side of the worm shaft 22. FIG. 7 shows a linkage that is similar to the linkage of FIGS. 3 and 4, but the FIG. 7 construction has a different support for the link 86'. The numerals used in FIG. 7 and in FIGS. 3 and 4 are the same, but corresponding elements in FIG. 7 are identified by primed numerals. The functions of the two constructions are the same. Pin 90' of FIG. 7 is grooved to permit a roll pin 94 to register therewith. The pin 94 is received in a pin opening formed in the worm shaft 22.

One end of the valve spool 62 is formed with an extension 96 in which is located an opening 98. The pin 82 extends through the opening 98 and registers therewith as indicated best in FIG. 7. The central part of the pin 82 is formed with a crowned surface 100 to permit oscillating motion of the pin 82 with respect to the valve spool 62.

The inlet port 76 communicates with positive displacement pump 102 which is driven by the vehicle engine. The low pressure side of the pump communicates with fluid supply tank 104 which in turn communicates with the interior of the valve spool 62.

A valve spring 106 is situated between the spool 62 and the shaft 12. This eliminates backlash between the pin 82 and the valve spool 62.

In order to overcome the effect of the force acting on the spool 62 by the spring 106, the torsion rod 48 is positioned relative to the shaft 12 during assembly with a predetermined amount of torque.

Figure 6:
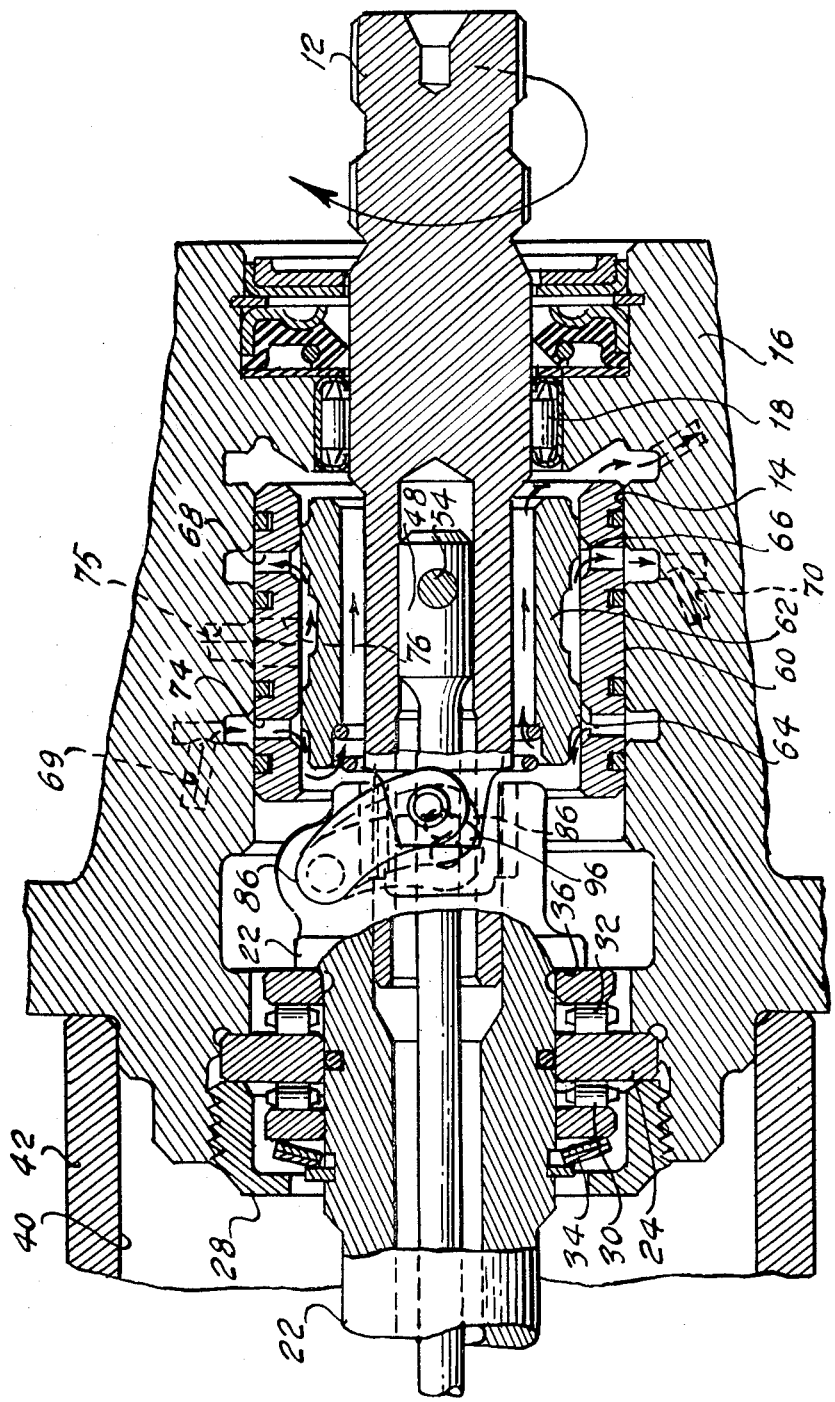
FIG. 6 is a cross sectional view of the torque transmitting link of the assembly of FIGS. 1A and 1B as seen from the plane of section line 6—6 of FIG. 1B.

The angular dispositions of the link 86 are indicated best in FIG. 6. When torque is applied to the shaft 12, the unsupported end of the link 86 is moved about the axis of the pin 90 as torque is imparted to the worm shaft 22. This torque transfer is accompanied by a slight angular movement of the link 86. This in turn causes an axial adjustment of the valve spool 62 thereby causing an increase in the degree of communication between the inlet port 76 and one of the working chambers of the servo motor. At the same time, the degree of communication between the other working chamber of the servo motor and the exhaust region within the valve spool 62 is increased. This introduces a pressure force acting on the piston 38 which complements the mechanical force distributed to the worm shaft 22 from the driver operated shaft 12. As rotation of the shaft 12 with respect to the shaft 22 occurs, torsion bar 48 deflects thereby causing a mechanical torque to transfer therethrough to the driven worm gear 22. Deflection of the shaft 48 may take place within the tolerance permitted by the lost motion provided by the reaction shoulders formed by extensions 56 and 58 on the shaft 12.

If a torque is applied to the shaft 12 in a clockwise direction as viewed in FIG. 3, a clockwise torque will be distributed to the driven worm shaft 22 through the torsion bar causing it to deflect. This motion will cause link 86, as viewed in FIG. 6, to move in a counterclockwise direction which in turn causes the valve spool 62 to shift in a right hand direction. This will increase the degree of communication between port 76 and port 68 hereby causing a pressure increase in working chamber 44. A corresponding increase in the degree of communication between port 74 and exhaust region also takes place. The hydrostatic force acting on the piston produces a main steering effort and a relatively small proportion of the total steering torque is supplied by the operator. Conversely, if torque is applied to the shaft in the opposite direction, the axial groove 78 on cooperating end 80 of the pin 82 will cause the link 86 to move in a clockwise direction, as viewed in FIG. 6, thereby causing the valve spool 62 to shift in the left hand direction. This will cause an increase in the degree of communication between the inlet port 76 and the port 74 causing an increase in pressure in working chamber 46.

Figure 8:
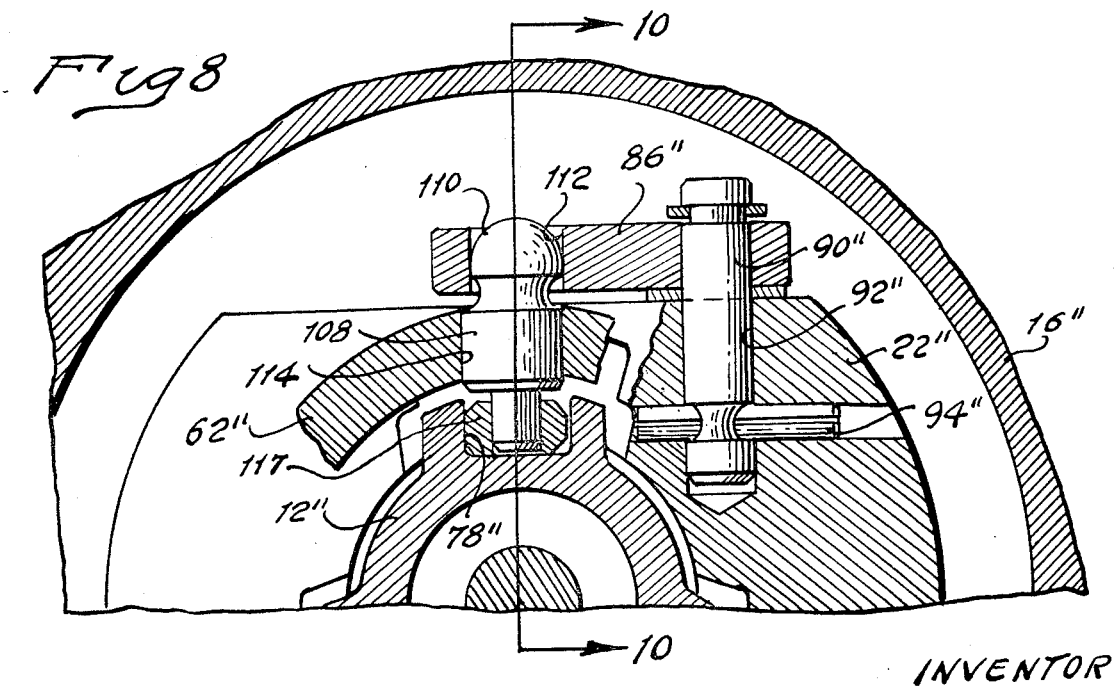
FIG. 8 is an alternate construction for the linkage assembly for actuating the valve assembly of my invention. It is taken along section line 8—8 of FIG. 10.
Figure 9:
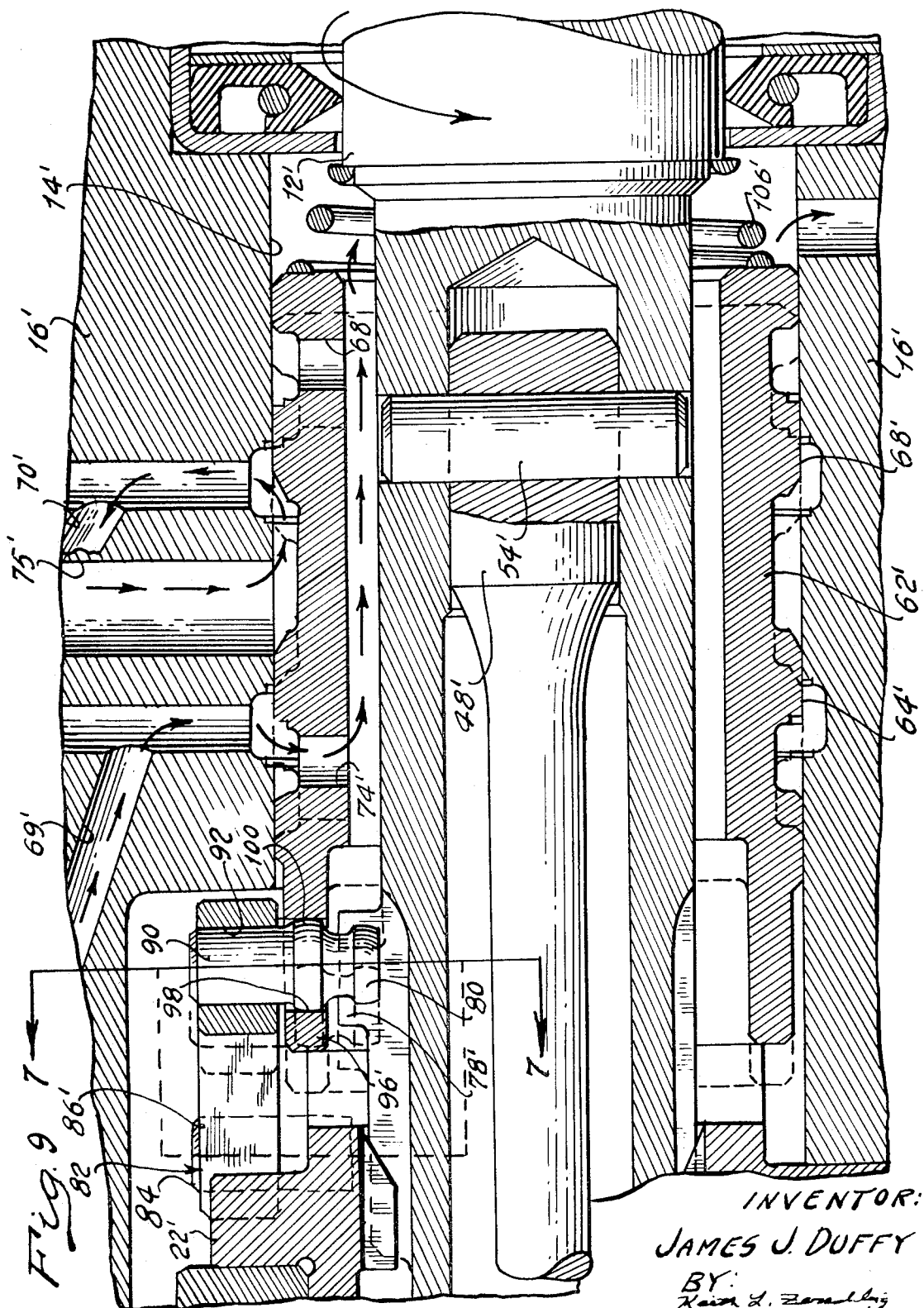
FIG. 9 is a cross sectional view taken along the plane of section line 9—9 of FIG. 7.
Figure 10:
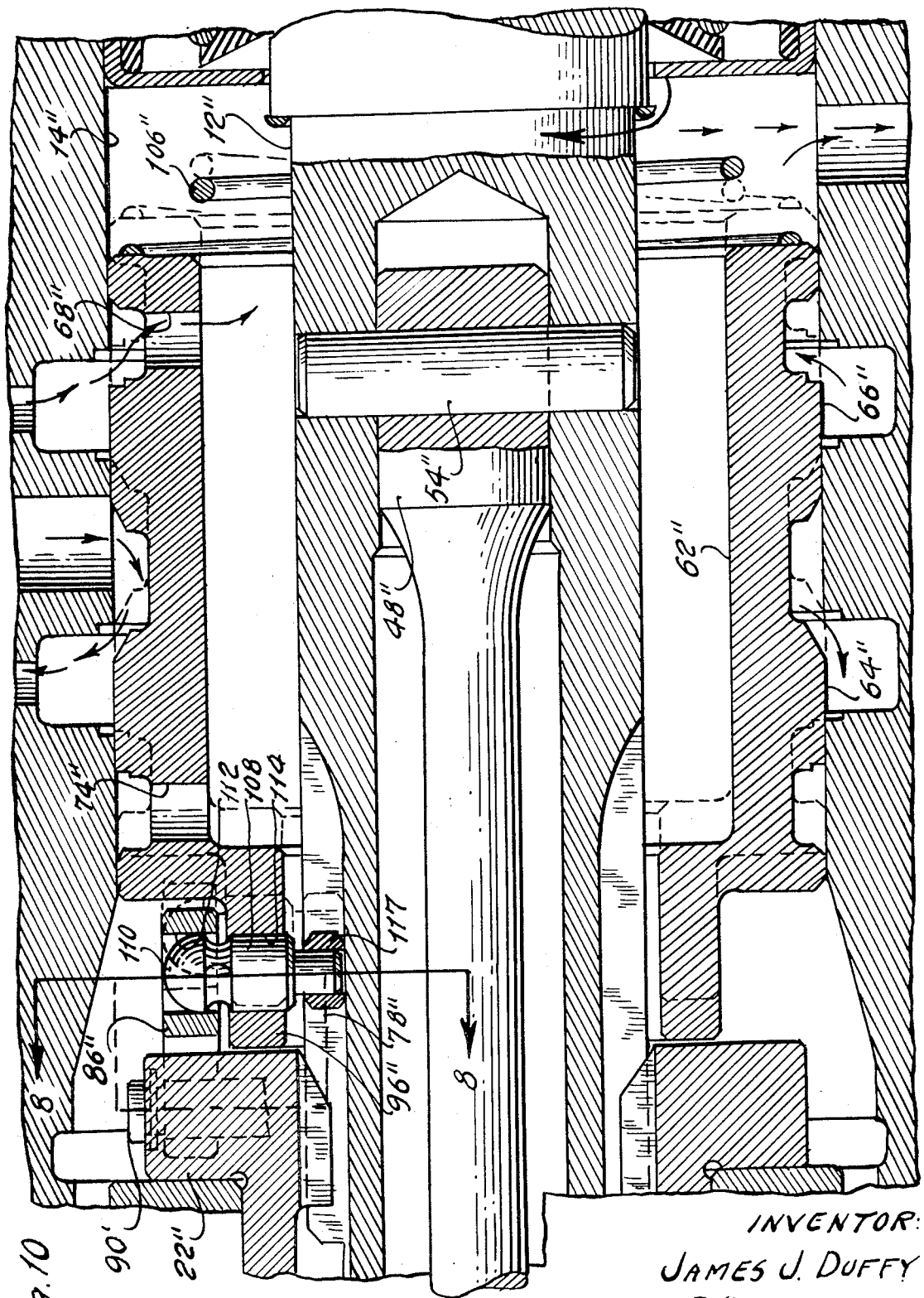
FIG. 10 is a cross sectional view taken along the plane of section line 10—10 of FIG. 8.

In FIG. 8, I have illustrated an alternate construction for the valve actuating linkage. Elements shown in FIG. 8 that have counterpart elements in FIGS. 3 through 7 are identified by the same reference numberals although double prime notations are added. The FIG. 8 construction includes a pin 108 having a crowned end 110 received within a circular opening 112 in the unsupported end of the link 86". The intermediate portion of the pin 108 is received within an opening 114 formed in spool 62". The other end of the pin 108 carries an anti-friction roller 117 which is received within groove 78" in the driving shaft 12".

Because of the crowned end 110, it is possible for the axis of the pin 108 to assume nonparallel disposition with respect to the axis of the support pin 90' which carries the link 86''. The mode of operation of the embodiment of FIG. 8 is the same as that described with reference to FIG. 1. Torque transmitted to the shaft 12'' will result in axial movement of the roller 117 within the groove 78'' thereby causing shifting movement of the spool 62'' in one direction or the other depending upon the direction of torque applied to the shaft 12''. The shifting movement of the spool is due to the change in the angle of the link 86'' with respect to the shaft 22''.

In each embodiment of my invention the degree of friction involved in moving the valve spool is at a minimum. The device may be calibrated readily and the calibration is maintained throughout the operation of the mechanism because of the positive relationship of the movement of the spool with respect to the displacement of the shaft 12 upon deflection of the torsion bar 48. Calibration can be achieved at the outset by means of the adjuster shown in FIG. 5. This includes a pin 119 which is received within an opening 118 formed in the valve sleeve 60. The pin 119 is eccentrically positioned within an opening 120 formed in rotary adjustment element 122. The element 122 extends externally of the housing 16. It is held in place by a lock nut 124.

The member 122 is formed with a conical sealing surface 126. As the member 122 is adjusted with a suitable hand tool, the eccentric pin will cause axial adjustment of the sleeve 60 so that an eccentric position is found, at which time, the pressures on the other side of the piston are balanced. After the adjusted position is found, the pin 116 maintains the sleeve 60 securely in place.

The worm shaft 22 is connected to piston 38 by means of a recirculating ball nut assembly 128. This includes a series of steel balls 130 located in external helical groove 132 and internal helical groove 134 which are situated in registry as indicated in FIG. 1. The balls 132 form a continuous circuit as they pass through a crossover tube 136 from one location on the helical grooves to another upon relative rotation of the worm shaft 22 with respect to the piston 38.

Rotation of the worm shaft 22 will cause axial movement of the piston 38. Rack teeth 138 engage a segment of a rack gear 140 mounted for oscillation about an axis that is transverse to the axis of the piston 38. Rack gear 140 in turn is connected to a driven portion of the steering system.

Having thus described preferred embodiments of my invention, what I claim and desire to secure by U.S. Letters Patent is:

1. A power steering mechanism comprising a fluid motor having a cylinder and a piston movable axially therein and cooperating therewith to define a pair of opposed working chambers, a driving shaft formed coaxially with respect to said piston, a worm shaft, a rotary connection between said worm shaft and said piston whereby rotation of said worm shaft relative to said piston causes translation of said piston in the direction of the axis of said worm shaft, a mechanical connection between said driving shaft and said worm shaft, a pressure source, conduit structure connecting said pressure source and said fluid motor including passages communicating with each working chamber, valve means including a movable valve spool situated in and partly defining said passages, said valve spool having valve lands adapted to selectively increase and decrease the degree of communication between said pressure source and each of said working chambers upon shifting movement thereof, said mechanical connection between said driving shaft and said worm shaft including a linkage element pivoted on one of said shafts, a cam slot formed in the other said shafts, a cam follower carried by said link registering with said cam slot whereby said link pivots about its pivot axis upon relative displacement of said driving shaft with respect to said worm shaft, said valve spool being connected to said cam follower whereby angular displacement of said link results in axial displacement of said valve spool thereby controlling pressure distribution to said motor.

2. A power steering mechanism comprising a fluid motor having a cylinder and a piston movable axially therein and cooperating therewith to define a pair of opposed working chambers, a steering shaft formed coaxially with respect to said piston, a worm shaft, a rotary connection between said worm shaft and said piston whereby rotation of said worm shaft relative to said piston causes translation of said piston in the direction of the axis of said worm shaft, a mechanical connection between said driving shaft and said worm shaft, a pressure source, conduit structure connecting said pressure source and said fluid motor including passages communicating with each working chamber, valve means including a movable valve spool situated in and partly defining said passages, said valve spool having valve lands adapted to selectively increase and decrease the degree of communication between said pressure source and each of said working chambers upon shifting movement thereof, said mechanical connection between said driving shaft and said worm shaft including a linkage element pivoted on one of said shafts, a cam slot formed in the other of said shafts, a cam follower carried by said link registering with said cam slot whereby said link pivots about its pivot axis upon relative displacement of said driving shaft with respect to said worm shaft, said valve spool being connected to said cam follower whereby angular displacement of said link results in axial displacement of said valve spool thereby controlling pressure distribution to said motor, the connection between said driving shaft and said worm shaft including a torsion rod connected at one end thereof to said drive shaft and at the other end thereof to said worm shaft, said torsion rod deflecting upon application of torque to said drive shaft thereby permitting a limited angular displacement of the former with respect to the latter thus causing angular adjustment of said link and movement of said cam follower in said cam groove.

3. The combination set forth in claim 1 wherein said link is pivoted on said worm shaft at one end thereof and wherein the other end of said link carries said cam follower, said cam groove being formed in said drive shaft, said cam follower registering with said cam groove whereby said valve spool is moved in an axial direction upon displacement of said driving shaft with respect to said worm shaft.

4. The combination set forth in claim 2 wherein said link is pivoted on said worm shaft at one end thereof and wherein the other end of said link carries said cam follower, said cam groove being formed in said drive shaft, said cam follower registering with said cam groove whereby said valve spool is moved in an axial direction upon displacement of said driving shaft with respect to said worm shaft.

5. The combination set forth in claim 1 including spring means for biasing said valve spool to a central, neutral position whereby pressure distribution to each working chamber is balanced when no torque is applied to said driving shaft.

6. The combination set forth in claim 2 including spring means for biasing said valve spool to a central neutral position whereby pressure distribution to each working chamber is balanced when no torque is applied to said driving shaft.

7. The combination set forth in claim 3 including spring means for biasing said valve spool to a central neutral position whereby pressure distribution to each working chamber is balanced when no torque is applied to said driving shaft.

8. The combination set forth in claim 4 including spring means for biasing said valve spool to a central neutral position whereby pressure distribution to each working chamber is balanced when no torque is applied to said driving shaft.

9. The combination set forth in claim 1 wherein said cam follower is secured to and held fast by said link, said cam follower having a crowned portion registering with said cam groove and a second crowned portion engageable with said valve spool whereby angular adjustment of the axis of said follower with respect to the axis of said driving shaft and the axis of said valve spool is accommodated.

10. The combination set forth in claim 2 wherein said cam follower is secured to and held fast by said link, said cam follower having a crowned portion registering with said cam groove and a second crowned portion engageable with said valve spool whereby angular adjustment of the axis of said follower with respect to the axis of said driving shaft and the axis of said valve spool is accommodated.

11. The combination set forth in claim 3 wherein said cam follower is secured to and held fast by said link, said cam follower having a crowned portion registering with said cam groove and a second crowned portion engageable with said valve element whereby angular adjustment of the axis of said follower with respect to the axis of said driving shaft and the axis of said valve spool is accommodated.

12. The combination set forth in claim 4 wherein said cam follower is secured to and held fast by said link, said cam follower having a crowned portion registering with said cam groove and a second crowned portion engageable with said valve element whereby angular adjustment of the axis of said follower with respect to the axis of said driving shaft and the axis of said valve spool is accommodated.

13. The combination set forth in claim 5 wherein said cam follower is secured to and held fast by said link, said cam follower having a crowned portion registering with said cam groove and a second crowned portion engageable with said valve spool whereby angular adjustment of the axis of said follower with respect to the axis of said driving shaft and the axis of said valve spool is accommodated.

14. The combination set forth in claim 6 wherein said cam follower is secured to and held fast by said link, said cam follower having a crowned portion registering with said cam groove and a second crowned portion engageable with said valve element whereby angular adjustment of the axis of said follower with respect to the axis of said driving shaft and the axis of said valve spool is accommodated.

15. The combination set forth in claim 7 wherein said cam follower is secured to and held fast by said link, said cam follower having a crowned portion registering with said cam groove and a second crowned portion engageable with said valve element whereby angular adjustment of the axis of said follower with respect to the axis of said driving shaft and the axis of said valve spool is accommodated.

* * * * *